United States Patent Office 3,421,283
Patented Jan. 14, 1969

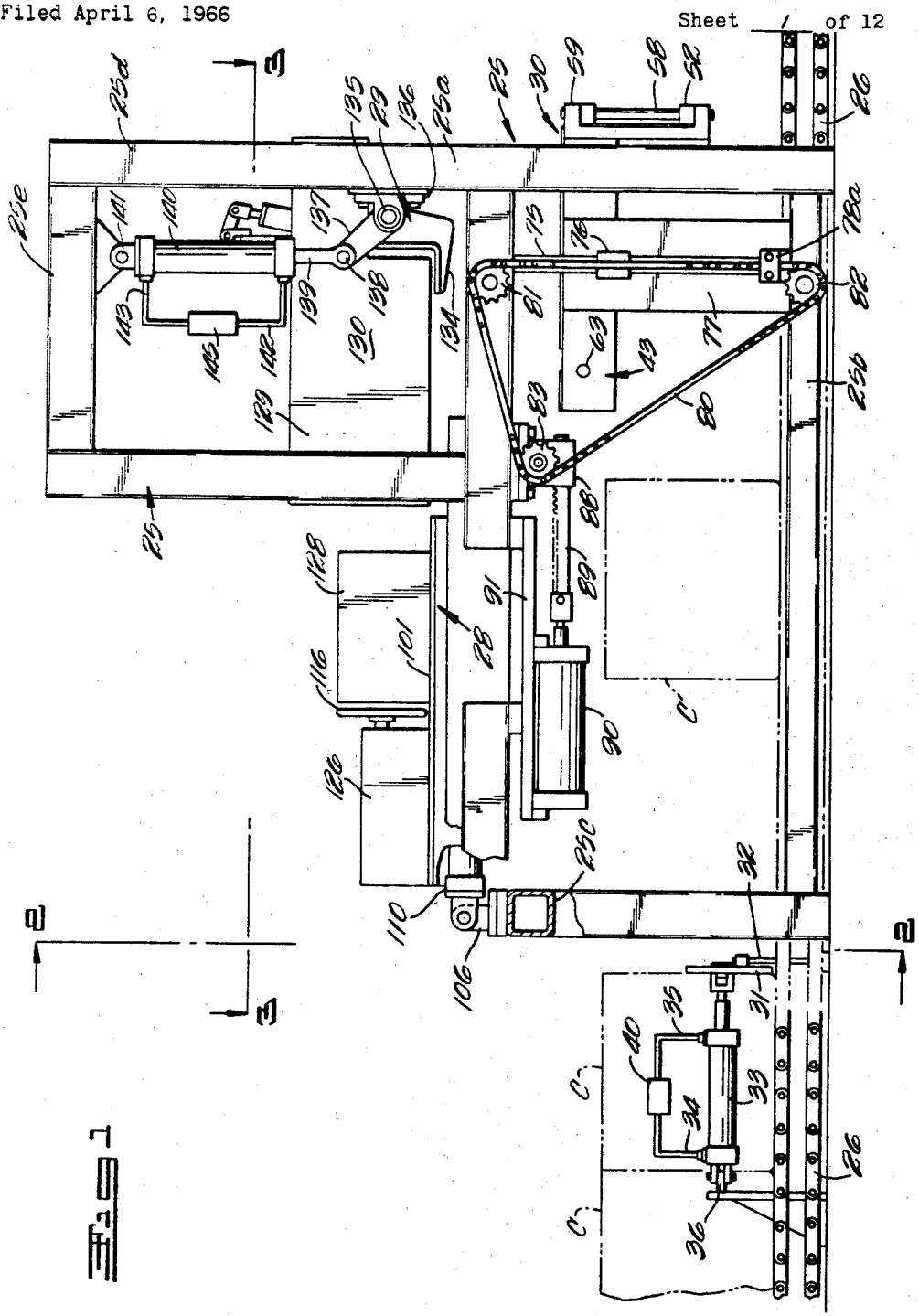

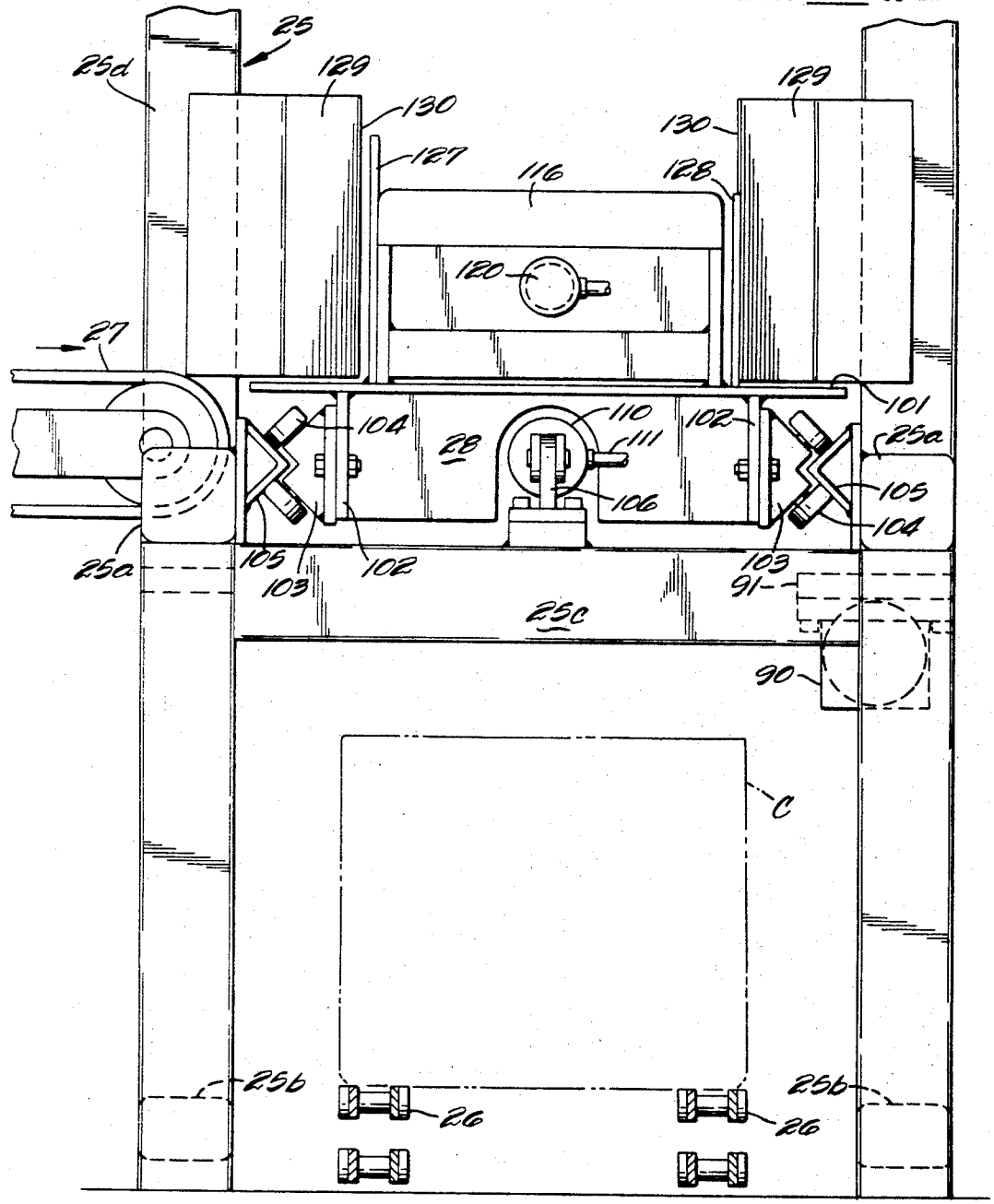

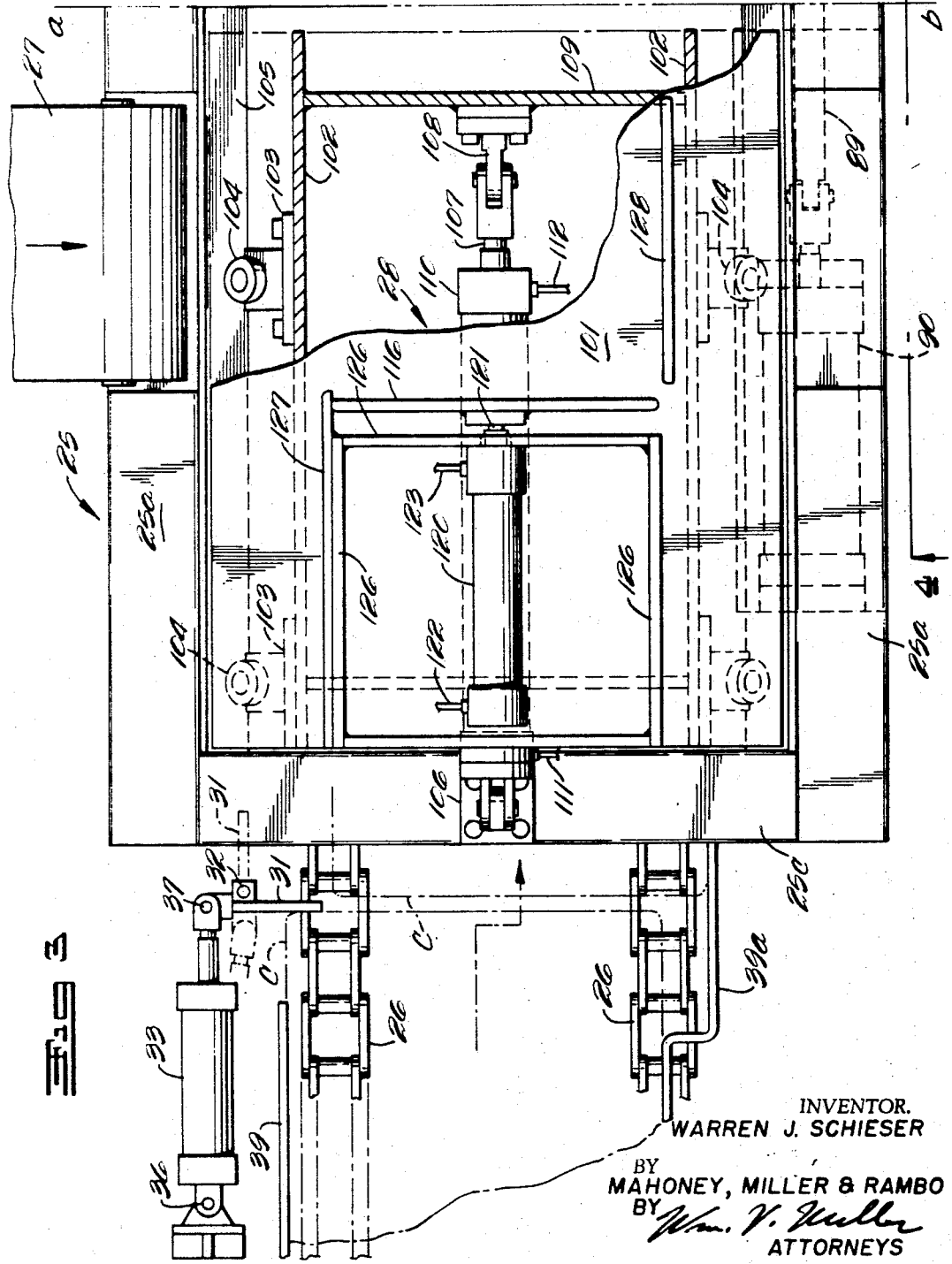

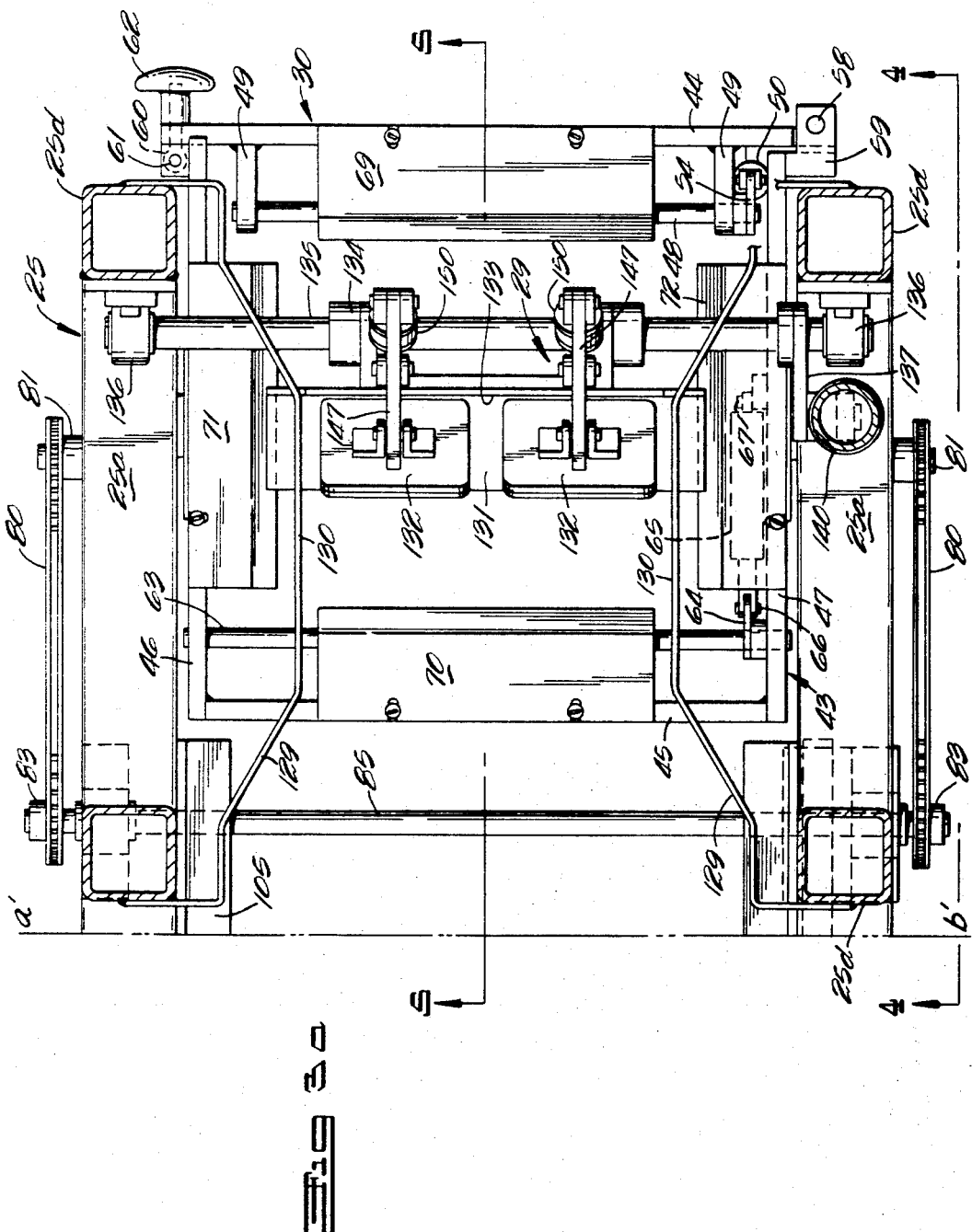

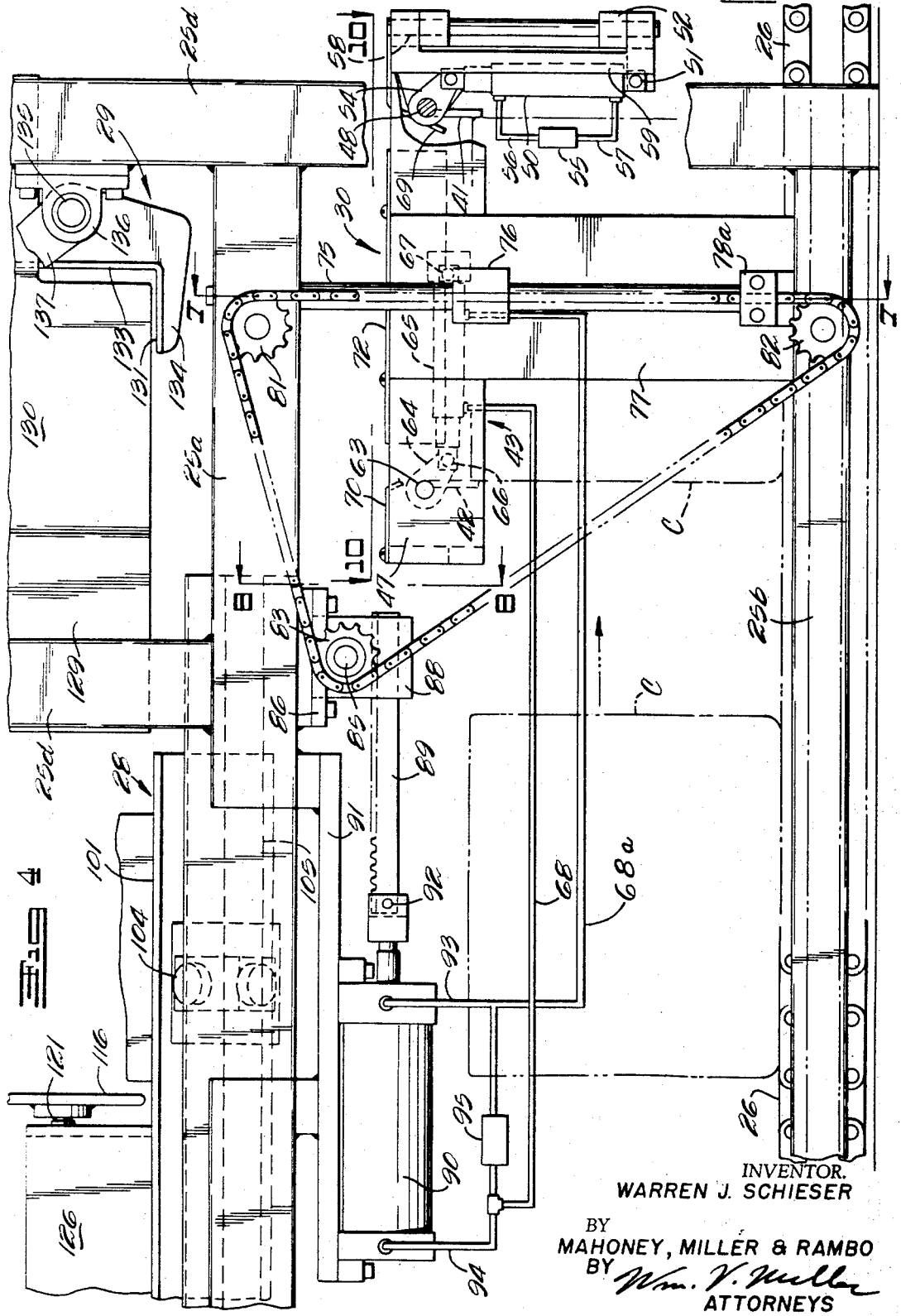

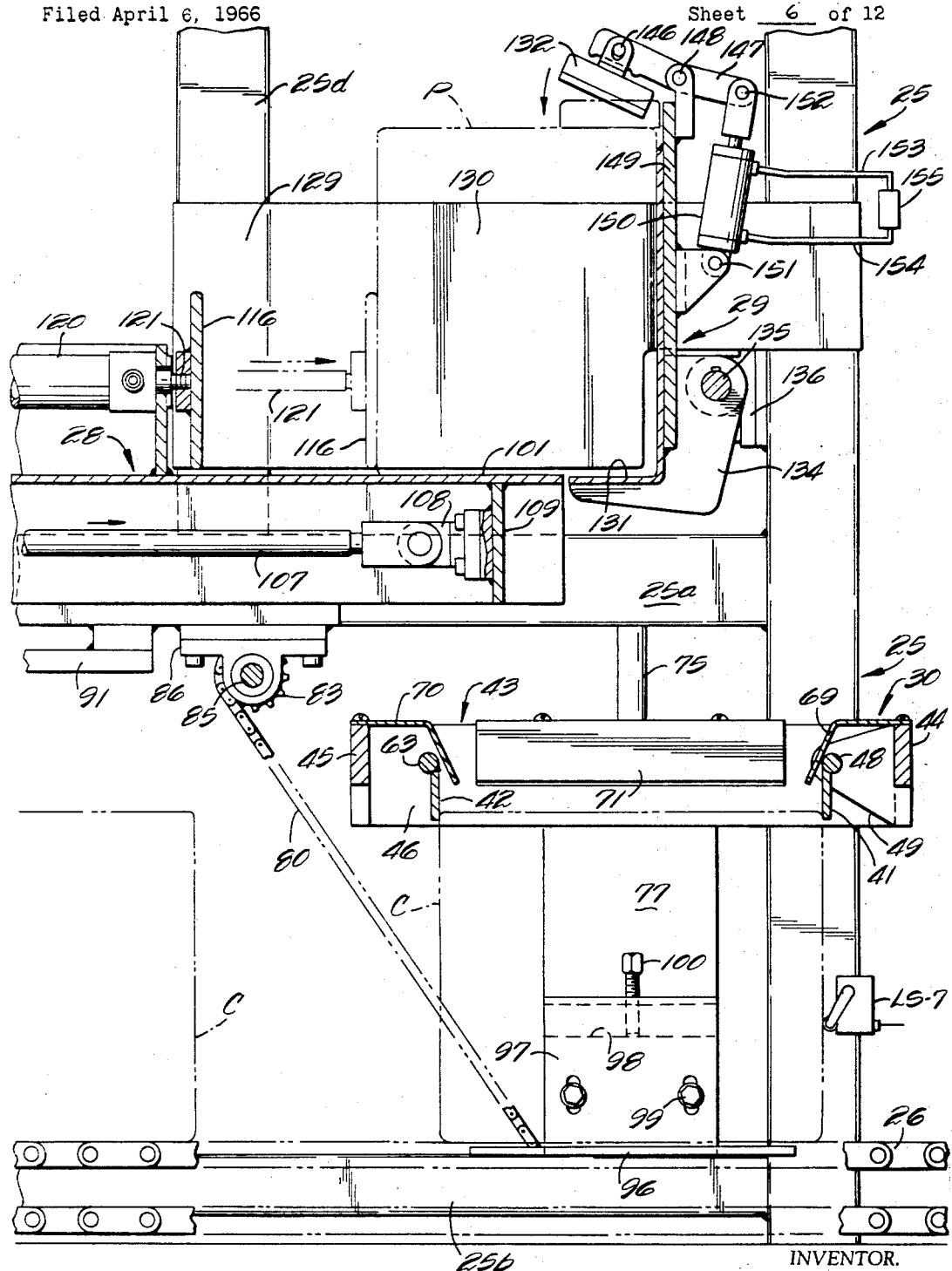

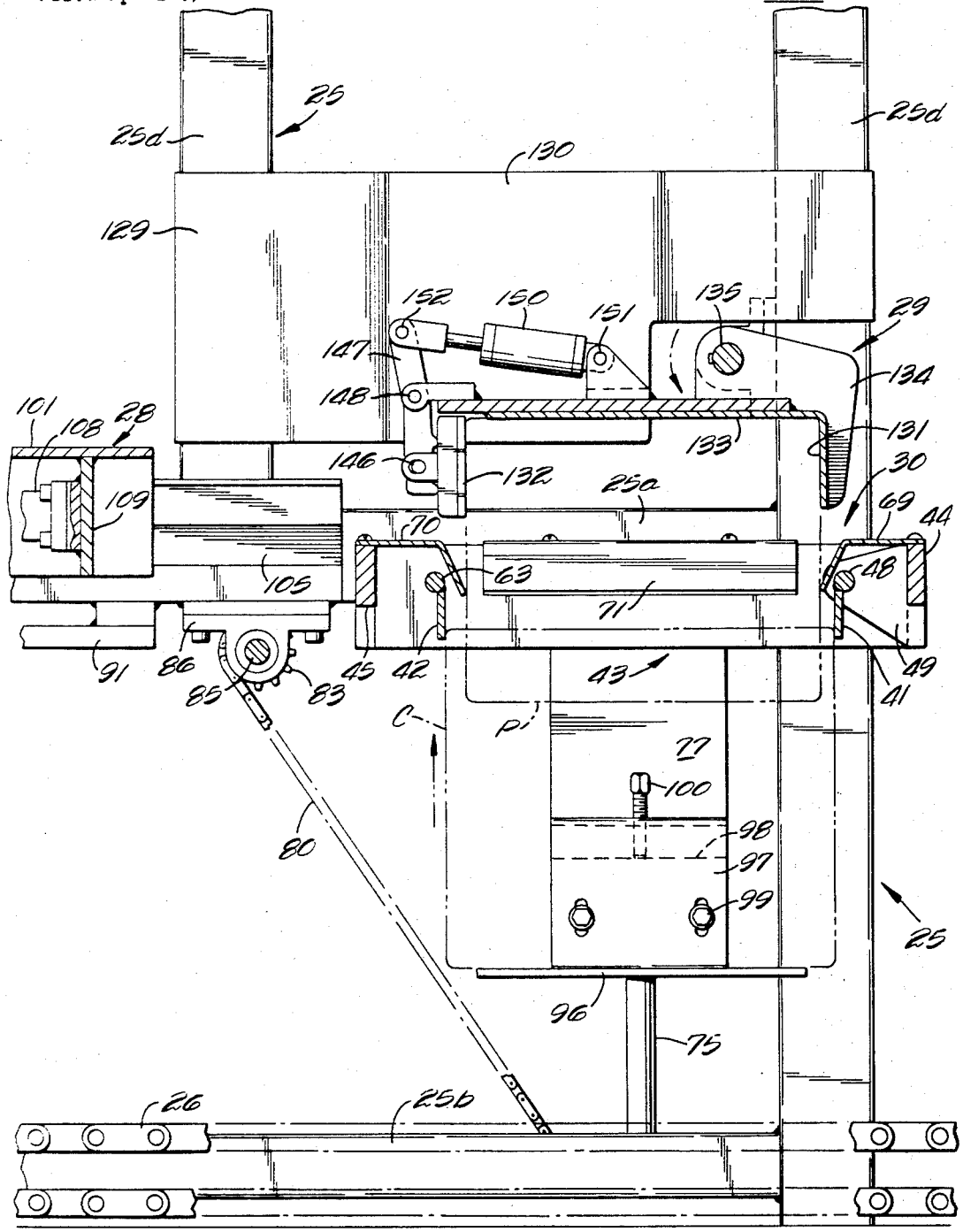

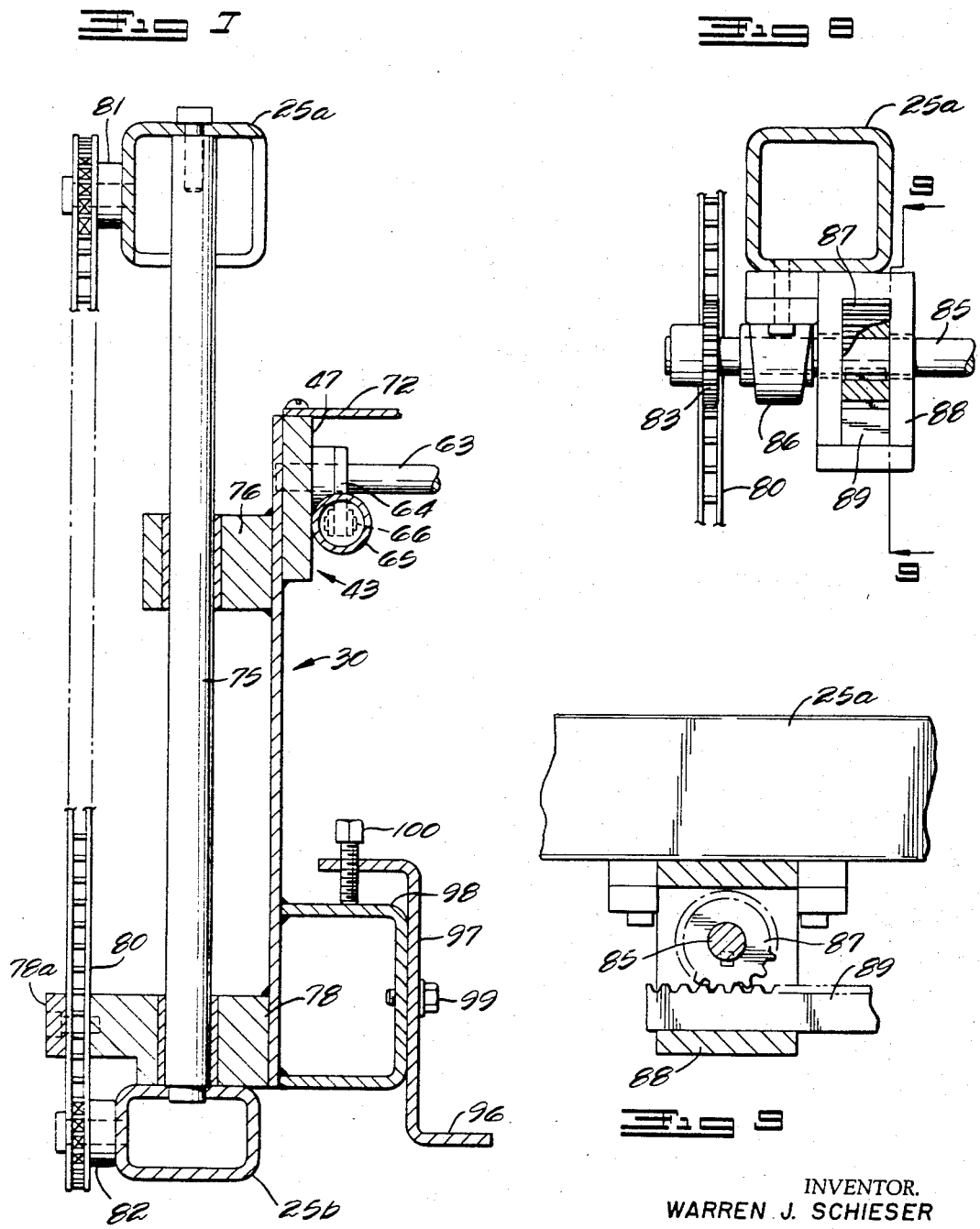

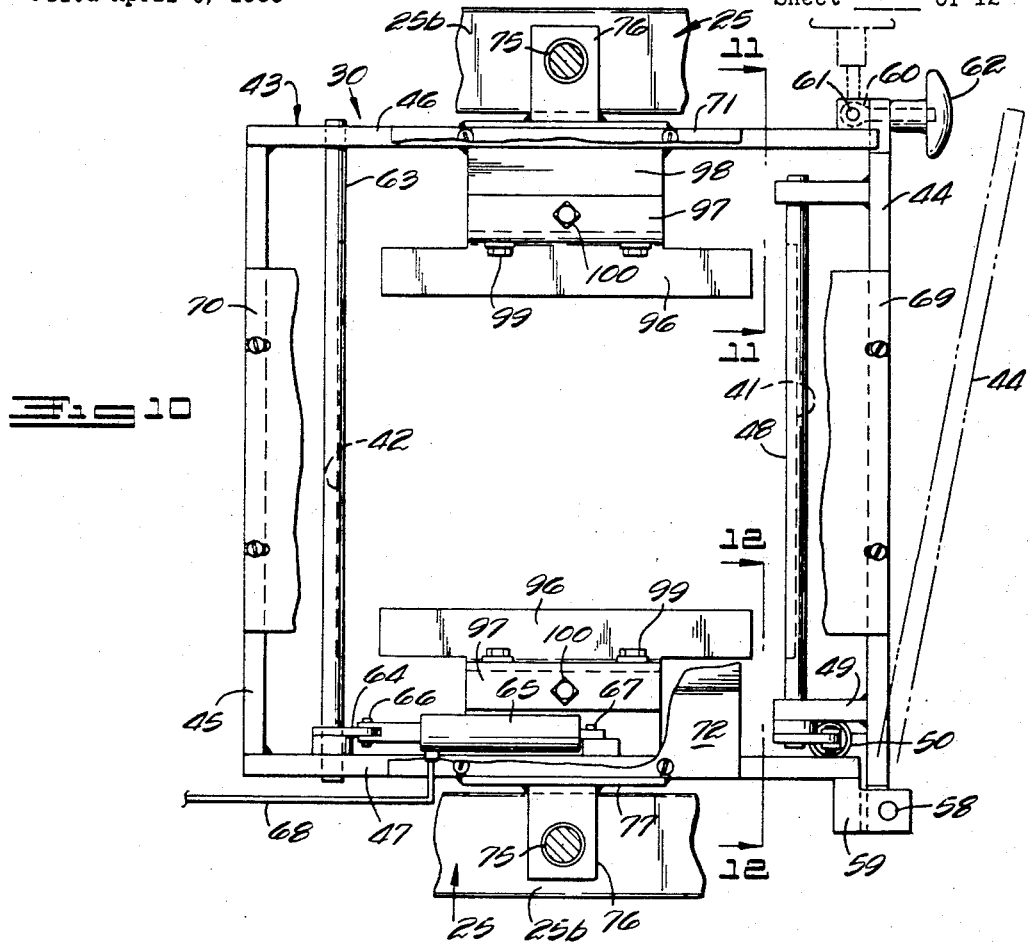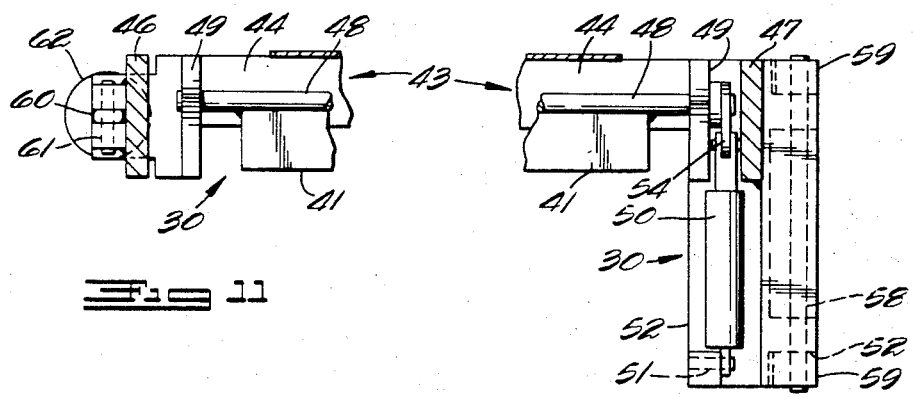

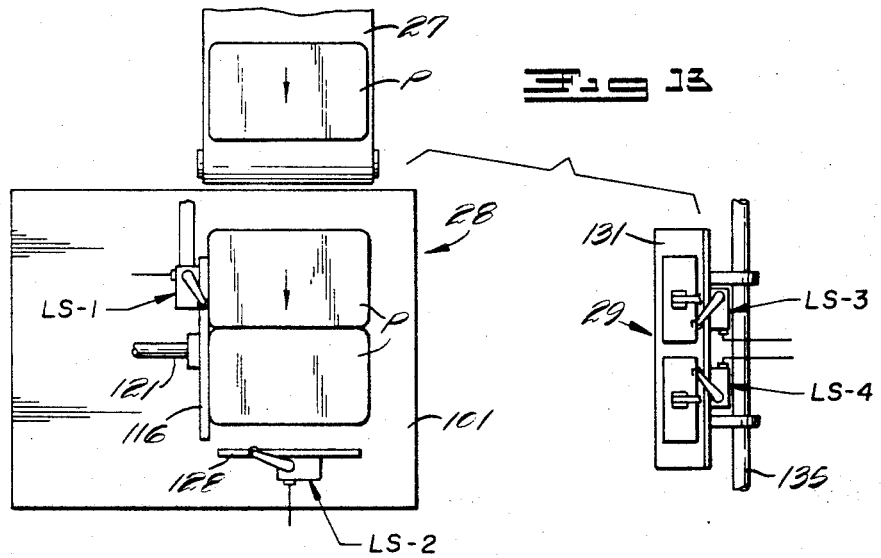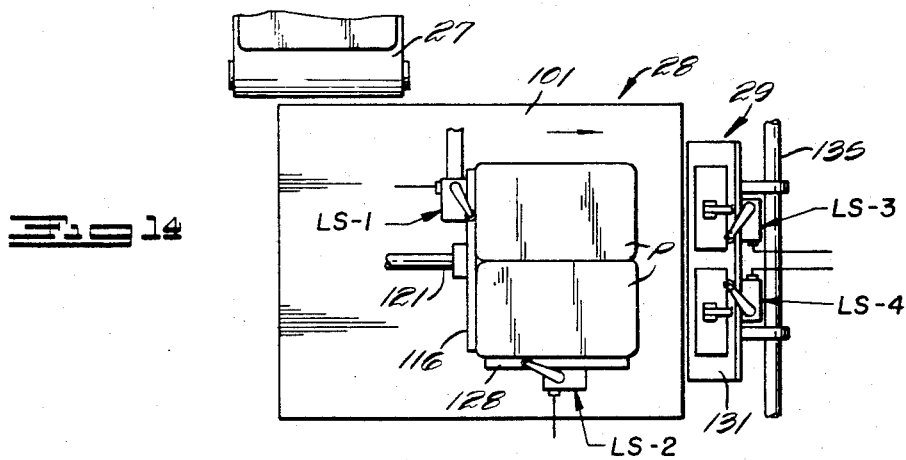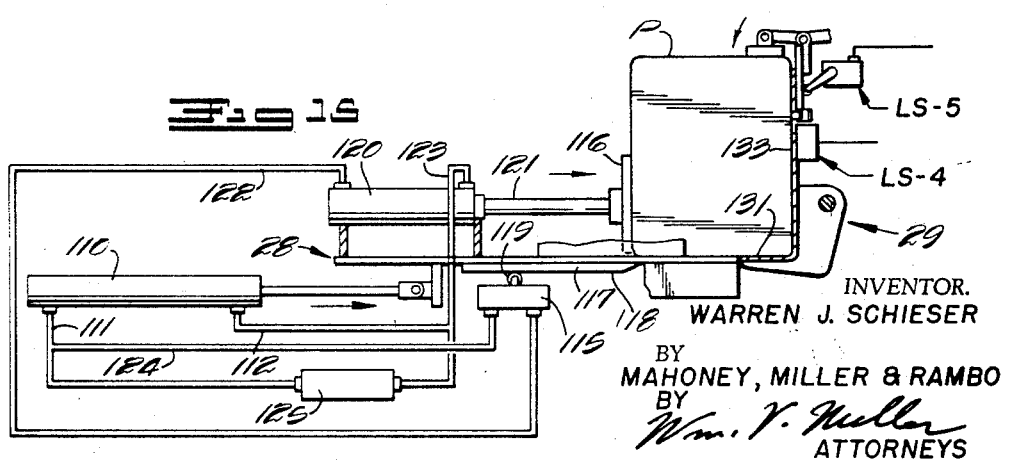

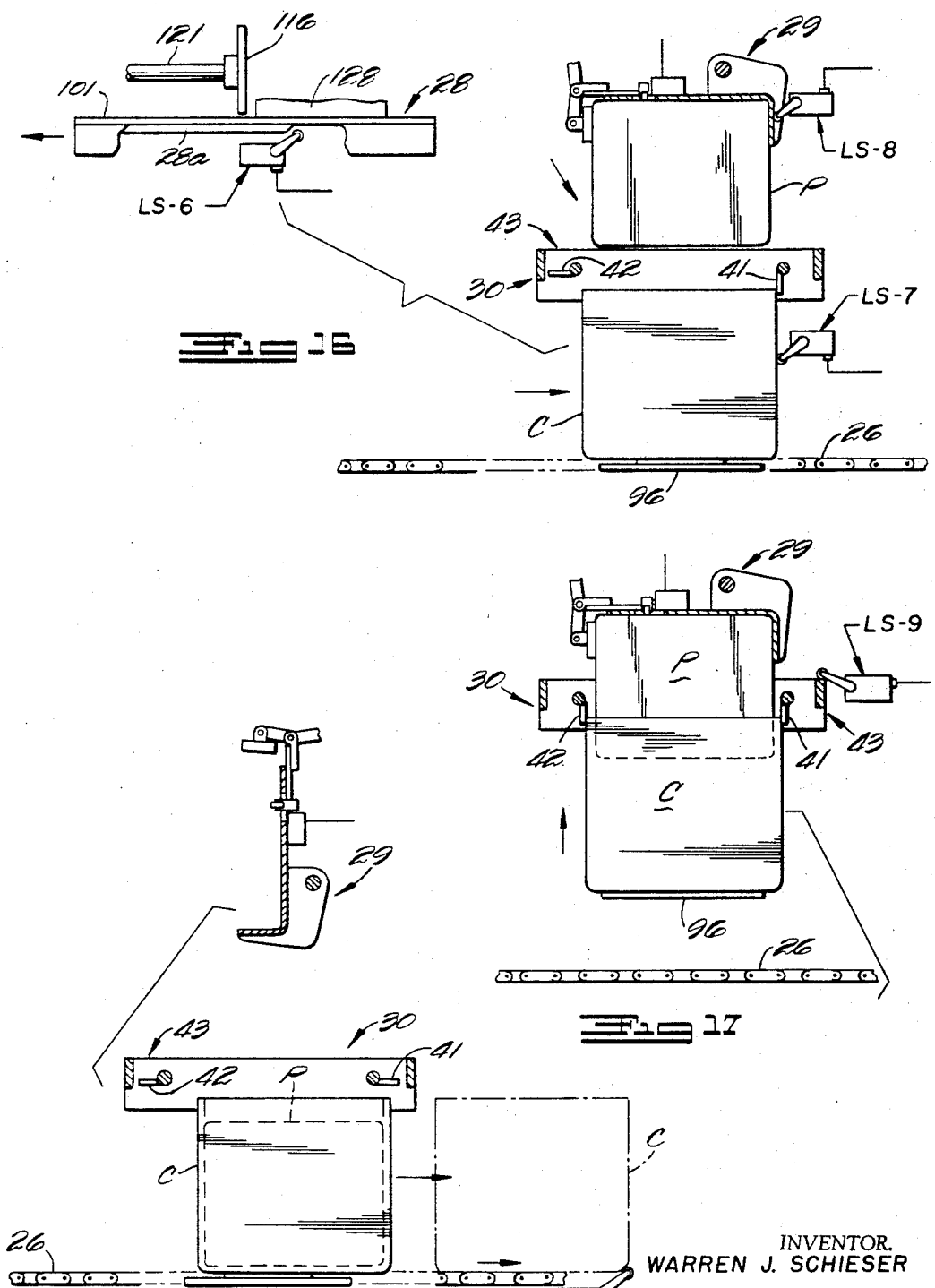

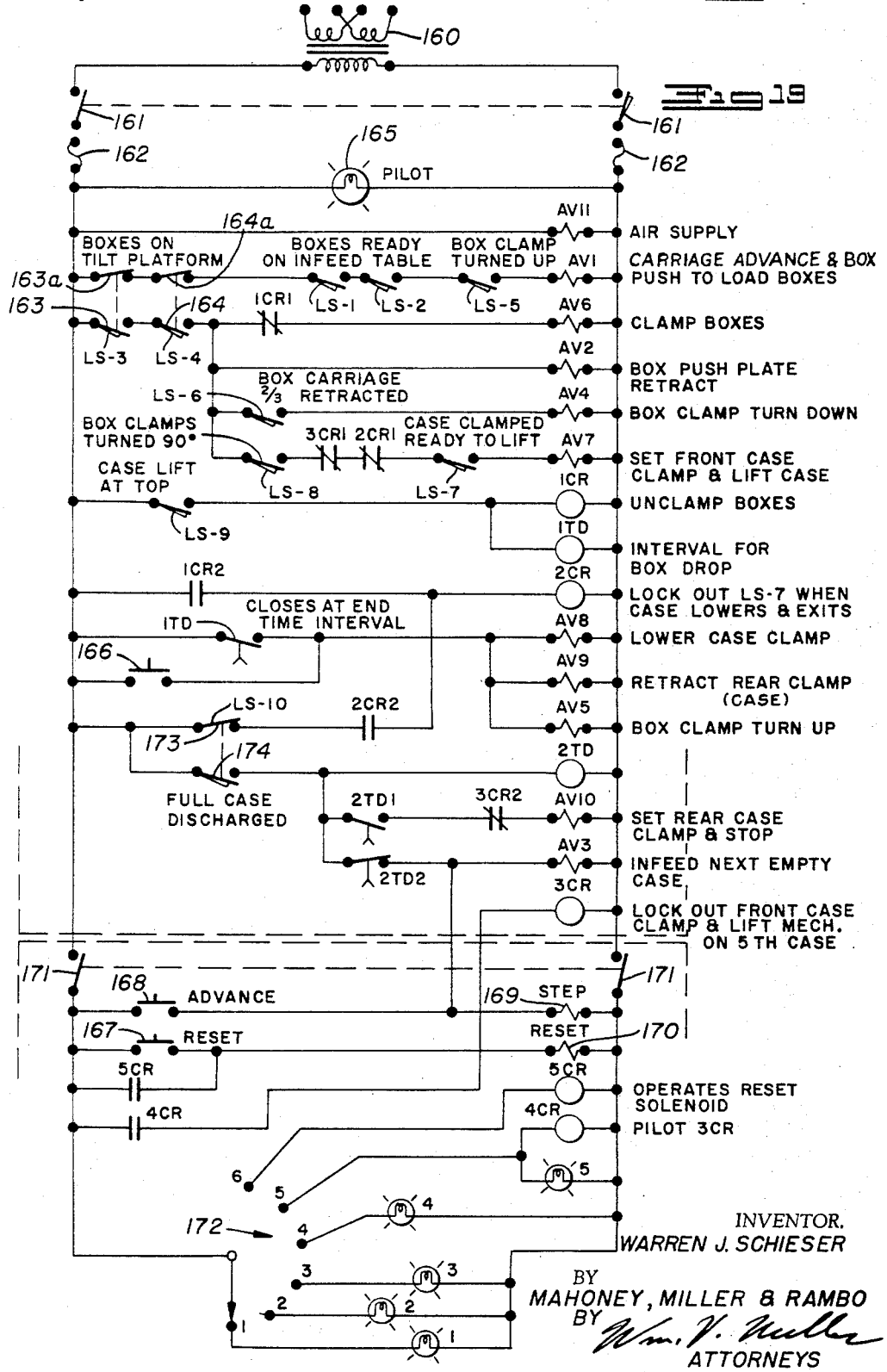

3,421,283
MACHINE FOR INSERTING PACKAGES INTO HANDLING CASES
Warren J. Schieser, Columbus, Ohio, assignor to The Corrugated Container Company, Columbus, Ohio, a corporation of Ohio
Filed Apr. 6, 1966, Ser. No. 540,679
U.S. Cl. 53—55                     18 Claims
Int. Cl. B65b 5/08; B65b 57/10

ABSTRACT OF THE DISCLOSURE

A machine which successively receives a plurality of packages and a plurality of handling cases at a loading station, reorients a group of the packages to properly fit into the case at the loading station and supports that group and a case in superimposed relationship, moves the group and case into telescoping relationship, releases the group to load the case, and finally removes the loaded case.

---

The machine of this invention is designed for receiving successive packages of a relatively fragile nature and automatically inserting a plurality of such packages into a more rugged handling case. The machine disclosed in the accompanying drawings and following description is designed for the purpose of inserting filled milk cartons of paperboard or the like into handling and delivery cases, which are formed of relatively heavy steel wire or the like, but it is to be understood that the machine can readily handle other types of packages and insert them in other types of cases.

The machine of this invention is automatically actuated upon receiving a plurality of packages from an inlet supply conveyor or other supply means. It includes a package clamping unit which automatically clamps one or more, usually a plurality, of packages and suspends them at a case-loading position. Before, during or after the time the packages are suspended in loading position, the machine receives a handling case, supplied to it by an inlet supply conveyor or the like, at the loading station where it occupies a position below the clamp-suspended packages. At the loading station, the case is automatically moved upwardly to partially telescope over the clamp-suspended packages. Then the package-clamping unit is automatically actuated to release the packages and permit them to drop the remainder of the distance into the case and an empty case release mechanism is actuated to infeed a following case. The loaded case is then lowered automatically and moved out of the machine by an outlet discharge conveyor. The sequence of operations of the machine is then automatically repeated as long as the necessary plurality of packages and the receiving cases are supplied thereto. The machine will accomplish the functions described, in any of the following sequences: i.e. empty case is received before packages are clamped and suspended; packages are clamped and suspended before empty cases are received; or both occur simultaneously.

In the accompanying drawings, I have illustrated a preferred form of a machine embodying my invention but it is to be understood that details can be varied without departing from basic principles of the invention.

In these drawings:

FIGURE 1 is a side elevational view of the machine.

FIGURE 2 is an enlarged vertical transverse sectional view taken along line 2—2 of FIGURE 1 at the front or inlet end of the machine.

FIGURE 3 is an enlarged horizontal sectional view taken at the level indicated by line 3—3 of FIGURE 1 but showing only the front or inlet half of the machine.

FIGURE 3a is a view similar to FIGURE 3 showing the rear or outlet half of the machine, FIGURE 3a matching at the line a'–b' with FIGURE 3 at the line a–b.

FIGURE 4 is a side elevational view taken from the position indicated at line 4—4 of FIGURES 3 and 3a.

FIGURE 5 is a longitudinal vertical sectional view taken along line 5—5 of FIGURE 3a.

FIGURE 6 is a longitudinal vertical sectional view similar to FIGURE 5 but showing parts of the machine in different positions.

FIGURE 7 is a transverse vertical sectional view taken along line 7—7 of FIGURE 4.

FIGURE 8 is a transverse vertical sectional view taken along line 8—8 of FIGURE 4.

FIGURE 9 is a vertical sectional view taken along line 9—9 of FIGURE 8.

FIGURE 10 is a horizontal sectional view taken along line 10—10 of FIGURE 4.

FIGURE 11 is a transverse vertical sectional view taken along line 11—11 of FIGURE 10.

FIGURE 12 is a transverse sectional view taken along line 12—12 of FIGURE 10.

FIGURE 13 is a schematic view illustrating the initial movement into the machine of two packages adapted to be inserted into a case.

FIGURE 14 is a view similar to FIGURE 13 but illustrating the movement of the packages into association with the package-clamping unit of the machine.

FIGURE 15 is a view similar to FIGURE 14 but showing the packages clamped by the clamping unit.

FIGURE 16 is a view similar to FIGURE 15 but showing the package-clamping unit turned at the loading station above the case adapted to receive the clamped packages.

FIGURE 17 is a view similar to FIGURE 16 but showing the case moved up into telescoping relationship to the packages suspended by the clamping unit.

FIGURE 18 is a schematic view similar to FIGURE 17 but illustrating the package-loaded case moving away from the loading station.

FIGURE 19 is a schematic diagram of the electrical system of the machine.

With reference to the drawings, the general structure of the machine is illustrated best in FIGURE 1, 2, 3, and 3a and its general arrangement and operation is illustrated schematically best in FIGURES 13 to 18, inclusive. The machine comprises a main upright frame 25 which supports the various operating units of the machine. A conveyor 26 for the cases C runs through the frame at a low level for bringing the empty cases into the machine at the inlet or front end and for taking away the loaded cases at the outlet or rear end of the machine. This conveyor may be of any suitable type which permits stoppage of the cases with the conveyor continuing to move thereunderneath continuously. Instead of entering the machine from the direction indicated, it may run in the opposite direction. A package-supplying conveyor 27, which may be in the form of a continuously-driven endless belt, is provided at a level higher than the case conveyor 26, and leads laterally into the machine at a right angle to the conveyor 26. This conveyor also may lead into the machine from either side. This package-supplying conveyor 27 will feed packages P onto a loading or infeed slide or carriage 28 which is reciprocable above and parallel to the case conveyor 26. This carriage 28 will be actuated to move packages carried thereby into association with a package-clamping and turning or tilting unit 29, at a loading station, where a case-clamping and elevating unit 30 is disposed at a level intermediate the upper unit 29 and the lower case conveyor 26. In an actual use of this machine, the packages P are cartons or boxes made of paperboard or the like, lined with plastic bags, and are filled with milk by a filling machine which also deposits them on the conveyor 27. In the example of the machine illustrated, two of these boxes are inserted into a receiving case C for handling and home delivery but as indicated, this number may vary. However, in the following description I will refer to a pair. As previously indicated, the receiving case is made of rugged material and may, for example, be of heavy steel wire. The pair of boxes fits snugly into each case but, before insertion into a case, must first be tilted or turned from the filling position through a ninety-degree arc. The unit 29 is designed to receive and clamp two of the boxes, and so turn them, before a case is moved upwardly into telescopic association therewith, as will later appear.

The case conveyor 26 is suitably driven continuously and will bring a supply of cases C to the machine. A stop-release arrangement is provided adjacent the front or inlet end of the machine to interrupt supply of the cases to the machine, until a case is needed, when it will release one of the cases for entrance into the machine. A suitable case stop-release arrangement for this purpose is indicated in FIGURES 1 and 3 and comprises a bell crank type stop arm 31 pivoted on a vertical axis 32 adjacent one edge of the conveyor 26 so that its longer end is movable from a normal stop position where it extends over the conveyor at a right angle thereto, as shown in full lines in FIGURE 3, to a release position outside the width of of the conveyor and parallel to the edge thereof, as shown by broken lines in FIGURE 3. A straight guide rail 39 is provided at the side of the conveyor adjacent the stop 31 and at the opposite side a deflector or guide 39a is provided along the edge of the conveyor to ensure that the case C will move over into cooperation with the stop arm and is offset to then allow passage of the case after release. The stop arm 31 has an upright case-engaging shoe portion 31b so that it will not snag on the wire case. The arm is moved between its two positions by means of a double-acting pneumatic ram 33 which is controlled through the air lines 34 and 35. On end of the ram is pivoted to a fixed support at 36, the support being adjacent the edge of the conveyor, and the other end is pivoted at 37 to the shorter end of the stop arm 31. The control of air flow through the lines 34 and 35 is by means of an electrically operated four-way pilot valve preferably of the spring-return poppet or spool type, which is designated 40 and is actuated by a single solenoid designated AV3 in FIGURE 19. Since the valve is spring-returned, actuation of it will move the stop arm 31 to non-obstructing position so as to permit the passage of one empty case C and then quickly return the stop arm to obstructing position to cause stoppage of the next case on the conveyor 26.

The single released case C is moved by the conveyor 26 toward the rear or outlet end of the machine to a position beneath the case-clamping and elevating unit 30 as indicated best in FIGURE 4. This unit includes a rear clamp member 41 and a front clamp member 42 and, as will later appear, at this time the rear clamp member 41 is in a position to stop the advance of the case with the conveyor 26. The unit 30 is illustrated best in FIGURES 1, 3a, 4, 5, and 6–9, inclusive.

The unit 30 comprises a square or rectangular frame 43 composed of transverse rear and front end members 44 and 45 (FIGURE 3a) normally disposed parallel with each other and at right angles to the longitudinally extending parallel side members 46 and 47. This frame is normally at a level to permit movement of the case C therebelow and the members 44 and 45 are of less depth (FIGURE 5) than the side members 46 and 47 so as to prevent any possible interference of the upper edge of the case therewith.

The rear clamp member 41, which initially serves as a case stop, is in the form of a blade that is fixed to a transverse pivot or rock shaft 48 which is rotatably mounted in laterally spaced, forwardly extending supports or lugs 49 which are rigidly mounted on the forward face of the rear transverse member 44. This shaft is under the control of a pneumatic ram 50 which has its lower end pivoted at 51 (FIGURE 4) to a bracket member 52 and its upper end pivoted at 53 to the outer end of a crank arm 54 which is keyed to the rock shaft 48. This ram 50 is controlled by a valve 55 (FIGURE 4) which is connected to the opposite ends thereof by the lines 56 and 57. The valve 55 preferably is an electrically actuated, four-way pilot valve of the poppet or spool type which is controlled in its movement axially in opposite directions by means of two solenoids designated AV9 and AV10 in FIGURE 19. The bracket 52 is formed as a part of the member 44 and is pivoted by a vertical hinge pin 58 (FIGURES 1, 4, 10 and 12) to a hinge support bracket 59 that is carried by the side member 47. Thus, as indicated by broken lines in FIGURE 10, the rear frame member 44 may be swung outwardly about the axis of the pin 58 to permit ready access to parts of the unit 30 or a case within the unit, if necessary, for example, if a case becomes jammed in the unit. The shaft 48 and associated parts, including the ram 50, will swing with the member 44. This member is normally latched in position by means of an eye bolt 60 pivoted by a vertical pivot 61 to the outer side of the side frame member 46 adjacent its rear end. This eye bolt has a knob 62 threaded thereon and is swingable into and out of a keeper notch at the outer end of the rear member 44 and it will be noted that in latched position, the rear end of the side member 46 extends into a receiving slotted recess in the adjacent forward surface of the rear member 44.

The forward case clamp member 42 is also carried by a transversely extending rock shaft and this shaft is designated 63 (FIGURES 3a, 5 and 10). This shaft is mounted for rocking movement in the opposed side members 46 and 47. It is rocked about its axis by means of a crank arm 64 keyed thereon adjacent one end thereof. Movement of this crank arm is controlled by a double-acting pneumatic ram 65 which has one end pivoted thereto, as at 66, and its opposite end pivoted, as at 67, to the side member 47 along the inside of which it lies. The ram 65 is controlled through a line 68 (FIGURE 4) which is connected to one end thereof and a line 68a which is connected to the other end thereof.

For guiding the packages P into the case (FIGURES 3a, 4, 5, 6, and 10), the frame 43 carries a series of guide plates 69, 70, 71, and 72. The plates 69 and 70 are carried by the respective end frame members 44 and 45 and extend downwardly and inwardly over the respective rock shafts 48 and 63 so as to protect them and the associated case clamp members 41 and 42 (FIGURES 5 and 6). All of the plates 69, 70, 71, and 72 are fixed to their respective supports and have guide flanges which extend downwardly and inwardly to form, in effect, a converging throat for guiding the packages P and case C into cooperative telescopic relationship.

The frame 43 and associated parts of the unit 30 are guided for vertical movement, as indicated best in FIGURES 1, 4, and 7 to 10, on a pair of posts or standards 75 located at opposite sides of the frame 25 laterally beyond the conveyor 26. These standards 25 are mounted rigidly between horizontal members 25a and 25b of the frame 25 and cooperate with upper guide lugs 76 provided with bushing-lined vertical openings through which they slidably extend, these lugs projecting laterally outwardly from the opposite sides of the frame 43, being carried by the plates 77 which are rigidly secured to the respective side members 46 and 47 thereof. Similar lower guide lugs 78 are rigidly carried on the lower ends of the depending plates 77 and project laterally outwardly therefrom and these lugs also provided with bushing-lined vertical openings through which the posts 75 slidably extend. The lower lugs 78 serve additionally as stops for contacting the lower horizontal member 25b of the frame 25 to determine the lowermost position of the frame 43 and the plates 77 are of sufficient height to position such frame at such a level, when it is in its lowermost position, that the case C can be moved therebeneath by the conveyor 26.

The frame 43 is moved vertically by an endless sprocket chain 80 disposed at each side of the frame 25. Each sprocket chain 80 passes around idler sprockets 81 and 82 carried on the respective frame members 25a and 25b in vertical alignment and around a driving sprocket 83 located forwardly of the sprocket 81 and keyed on the outer end of a pinion shaft 85 (FIGURES 8 and 9). The shaft 85 extends transversely across the frame 25 (FIGURE 3a) and each of its opposed ends is rotatably carried by means including bearings 86 attached to the lower sides of the associated frame members 25a. Each chain 80 is clamped to the associated lug 78 by means of a clamp 78a (FIGURE 7) at the outer end of the lug. The shaft 85 is oscillated to drive the two chains 80 by means of a rack and pinion arrangement at one end thereof which includes the pinion 87 keyed on the shaft and which is straddled by means of a yoke 88. This yoke slidably supports a rack 89 which meshes with the pinion. The rack 89 is reciprocated longitudinally by means of a double-acting pneumatic ram 90, shown best in FIGURE 4, which has its axis extending longitudinally of the frame 25 at one side thereof. This ram is carried by a horizontally disposed, transverse plate 91 rigidly secured to the lower side of the adjacent frame member 25a. The ram 90 is rigidly secured to the lower side of the plate and has an actuating rod which is pivotally connected at 92 to the adjacent end of the rack bar 89. The ram 90 is controlled by the air lines 93 and 94 connected to the opposite ends thereof and between which a valve 95 is connected. The valve 95 is of the electrically-operated, four-way spool pilot type and is moved axially in opposite directions by a pair of solenoids which are designated in FIGURE 19 as AV7 and AV8. The air line 68, which controls the ram 65, is connected to the line 94 (FIGURE 4) so that it is also controlled by the valve 95 to actuate the rams 65 and 90 simultaneously.

In addition to the engagement of the clamp members 41 and 42 with the case C at the lifting and loading station, the case is supported, when lifted, by the inwardly extending, laterally spaced and parallel shelves 96, shown best in FIGURES 5, 6, 7, and 10. These shelves, in their lowermost positions, are at a level just slightly below the upper supporting surface of the upper run of the conveyor 26 (FIGURES 16 and 18) and are movable vertically with the frame 43 from which they are suspended by the opposed plates 77. When the frame 43 is raised, the shelves 96 will engage with the bottom of the case C (FIGURE 17) to support it. Each shelf 96 projects inwardly from the lower edge of a support bracket 97 which in turn, is carried by a horizontal bracket 98 that is supported at the inner side of the plate 71. The bracket 97 is adjustably connected to the fixed bracket 98 by means of bolt and slot connections 99 and the adjustment can be made by means of a screw or bolt 100 tapped into the horizontal flange of the bracket 97 and having its lower end in engagement with the lower horizontal bracket 98. Thus, it will be apparent that by adjusting the bolts 100, the level of the shelves 96 can be accurately adjusted to properly position them at the desired level relative to the conveyor 26 with the frame 43 in its lowermost position. When properly adjusted, the case C, supported by the shelves 96, will extend upwardly beyond the lower edge of the clamp members 41 and 42 (FIGURE 6) with such members in dependent positions.

When the case C is moved into the lifting and loading position by the conveyor 26, at which time it will contact the rear case stop and clamp member 41, it will also engage a limit switch LS7, which is shown schematically in FIGURE 16 and connected in the electrical circuit of the machine in FIGURE 19. This limit switch LS7 may be mounted on the frame member 25d of the frame 25 as shown or on the frame 43 in such a position that when the case does move into cooperative engagement with the rear case clamp and stop member 41, it will actuate this switch. Also, when the case C is lifted to its uppermost position, the frame 43 of the unit 30, will engage a limit switch LS9, which is shown schematically in FIGURE 17 and connected in the electrical circuit in FIGURE 19. This limit switch may be mounted on the adjacent vertical frame member 25d so as to be engaged by the frame member 43 as it is moved into its uppermost position.

With the case C in the lifting and loading position, the packages P will be moved over the case, by mechanism illustrated in FIGURES 1, 2, 3, 3a, 4, 5, 6, and 13–18. As previously indicated, the inlet conveyor 27 moves the filled packages P onto the package infeed slide or carriage 28. This carriage is formed of a flat, horizontal, upper plate or table 101 which is carried by a rectangular frame which includes the logitudinally extending, laterally spaced, side members 102 (FIGURES 2 and 3) and these members carry at their outer sides, the longitudinally spaced, outwardly extending, roller-supporting brackets 103. Each bracket 103 carries a pair of guide rollers 104, with the axes of each pair disposed relatively at a right angle, which respectively engage the two flanges of a guide rail angle 105. The edges of this angle are welded or otherwise fastened to a plate which, in turn, is fastened to the inner surface of the adjacent longitudinal member 25a of the frame 25. Thus, the guide 105 is an inwardly directed, V-shape guide rail.

The carriage 28 is reciprocated by means of a double-acting, pneumatic ram 110, shown best in FIGURES 3 and 15. This ram is disposed with its axis extending longitudinally of the machine and parallel to the frame side members 25a and its one end is pivotally connected by means including a bracket 106 to a cross frame member 25c which extends between the frame members 25a. The opposite end of the ram 110 is provided with an outwardly or rearwardly extending rod 107 which is pivotally connected by means including a bracket 108 (FIGURE 5) to the rearward frame member 109 of the carriage 28. The supply of air for the ram 110 is controlled by means of the air lines 111 and 112 which, in turn, are controlled preferably by a four-way electrically-actuated valve 125 (FIGURE 15). As will be explained later, this valve 125 is actuated by the solenoids AV1 and AV2 which are controlled by various switches connected in the circuit shown in FIGURE 19.

The carriage 28 carries a package loading pusher plate 116 which is shown best in FIGURES 1, 2, 3, 4, 5, and 13–16. The pusher plate is reciprocated forwardly and rearwardly above the supporting surface of the table plate 101 by means of a double-acting pneumatic ram 120. The ram is enclosed within a housing 126 (FIGURE 1) which is fixed to the plate 101 and has an actuating rod 121 connected to the plate 116 which is positioned on edge and extends transversely of the plate 101. An upstanding guard plate 127 (FIGURE 3) is secured to the side wall of the housing 126 and extends rearwardly beyond the rear wall of the housing 126. In the retracted position of the plate 116, it is thus protected from contact by the packages being fed from the conveyor 27, since the plate 127 will advance with the carriage into the path of the packages and hold them back. Directly opposite the conveyor 27 and on the opposite side of the table plate 101 is an upright fixed stop plate 128 which is disposed laterally beyond and at a right angle to the movable pusher plate 116 (FIGURE 3) in retracted position. The plate 101 of carriage 28 carries an actuating cam means 117 which extends beneath and along the plate 101 (FIGURE 15) and has a cam surface 118 that engages the actuating button 119 of a valve 115 when the plate 101 moves toward package-loading position. Thus valve 115 is a three-way pilot valve of the spool or poppet type and is normally spring-returned. The ram 20 is controlled by air lines 122 and 123 (FIGURE 15). The line 122 is connected to one end of the valve 115 and the opposite end of this valve is connected to the line 111 which runs between the one end of the ram 110 and the one end of the valve 125. The line 123 is connected to the other end of the valve 125. The other end of the valve 115 is connected by the line 124 to the line 111.

The pusher plate 116, as shown, is designed to push two packages P at the proper time after they are moved off the end of the continuously moving package supplying conveyor 27 (FIGURE 13) laterally onto the table plate, 101. To detect when there are two packages on the table plate, the limit switches LS1 and LS2 are provided so that the switch LS2 is engaged by the leading package P and the switch LS1 is engaged by the next package P. The switch LS1 may be supported in a fixed position from the conveyor 27 and the switch LS2 from the plate 128. The manner in which these switches are connected in the circuit of the machine is illustrated in FIGURE 19. These switches will initiate action of the machine. Of course, the switches can be arranged so that a different selected number of packages P, moved onto the table plate 101, will start actuation of the machine. Other arrangements of the switches can be provided to insure that the required number of packages are on the infeed table plate 101 in contact with the stop plate 128 and with each other.

The packages P are moved by the carriage 28 into association with the package clamping and tilting unit 29 at the loading station. This unit 29 is illustrated best in FIGURES 1, 2, 3a, 4, 5, 6, and 14–18. At this station, the carriage 28 reaches its forwardmost position and the pusher plate 116 is actuated by the ram 120 to slide the two packages P off the table plate 101 and into position to be engaged and gripped by the unit 29. The unit 29 will, at this time, be in the package-receiving position shown in FIGURES 5 and 14. For centering the packages laterally on the unit 29 as they are guided into association therewith, guide wing plates 129 are provided and are attached to upright vertical posts or frame members 25d. These wing plates converge inwardly toward the loading station where they merge into guide wall surfaces 130 equally spaced on opposite sides laterally of the front and rear center line of the machine. These surfaces 130 are parallel and are sufficiently spaced laterally to snugly receive therebetween, a pair of the packages P or whatever number is to be inserted into the case C at the loading station. It will be noted from FIGURE 3a that the vertically disposed guide surfaces 130 are located laterally inwardly of the respective shelves 65 of the case-raising unit 30 so as to position the boxes directly over that unit.

The unit 29 includes a single stationary base or shelf clamp jaw 131 and an oppositely disposed pair of clamp jaws 132. The clamp jaws 132 of the pair are identical. In package-receiving position, the single clamp jaw 131 is at a lower level and the clamp jaws 132 are at an upper level, as shown in FIGURE 5, with all the clamp jaws cooperating to form a vise opening toward the pusher plate 116, with the opposed jaws 131 and 132 adapted to be moved relatively vertically to grip the packages P therebetween. The jaw 131, in the position shown in FIGURE 5, is flush with and, in effect, forms a shelf continuation of the table plate 101. At this time, the jaws 132 are at an upper inclined position and are spaced a sufficient distance above the jaw 131 to receive the packages P when they are slid off the table 101 by the pusher plate 116.

The jaw 131 is formed at one edge of a back-up plate 133, preferably being integral therewith. This plate and associated jaw 131 (FIGUREs 3a and 5) is carried by the rocker arms 134 which are keyed on a shaft 135 that extends transversely across the machine and has its ends rotatably mounted in the opposed bearings 136 carried by the upper portions of the frame posts 25d. This shaft is rocked by means of a crank arm 137 fixed thereon and pivotally connected at its outer end at 138 to the lower end of the actuating rod 139 of a double-acting pneumatic ram 140, which has its upper and pivotally supported at 141 on the upper longitudinal frame members 25e which are part of the frame 25. The turning ram 140 is controlled by means of the air lines 142 and 143 which are connected to a pilot control valve 145 preferably of the four-way spool type. Axial movement of this valve is controlled by a pair of solenoids AV4 and AV5 which are indicated connected in the circuit in FIGURE 19.

The opposed jaws 132 are disposed side-by-side (FIGURE 3a) so that each will engage one of the packages P. Two jaws 132 are provided to ensure gripping of each package even though there are differences in size between the two side-by-side supported packages. Each of these jaws is pivoted at 146 (FIGURE 5) to the outer end of a lever 147 which is supported intermediate its end at 148 by a bracket on a plate 149 attached to the plate 133. Each link 147 is rocked about its pivot 148 by means of a double-acting pneumatic ram 150. Each ram has one end pivotally connected to the plate 149 at 151 and its other end pivotally connected to the adjacent end of the lever 147 at 152. The two rams 150 are controlled simultaneously through the lines 153 and 154 by means of a control valve 155 connected thereto. This valve is preferably of the four-way spool type and is spring-returned in the proper direction to release the clamp jaws 132, that is, move them to the full-line position shown in FIGURE 5. The valve 155 is actuated to set the clamp jaws 132 by means of a solenoid AV6 which is shown connected in the electrical circuit in FIGURE 19.

Limit switches LS3 and LS4 are disposed in position (FIGURES 13 and 14) to be engaged by the two packages P of the pair when they are moved onto the jaw 131 which may be termed a tilt platform. For example, they may be carried by the plate 133. Another limit switch LS5 is mounted (FIGURE 15) for engagement with the plate 133 when it is upright and may be carried by one of the posts 25d. These switches are connected in the electrical circuit as shown in FIGURE 19. A limit switch LS6, which may be supported along one of the rails 105, is shown in FIGURE 16 and in the circuit in FIGURE 19 and will be closed by the cam 28a, carried on the lower surface of the plate 101 (FIGURE 16) of the package carriage 28, when the carriage is retracted ⅔ of its extent of movement and opened when the carriage moves forward ⅓ of its travel toward case-loading position. This switch may be mounted along one of the rails 105. Another switch LS8 is provided, as shown in FIGURE 16 and in the circuit in FIGURE 19, for engaging the plate 133 of the box clamping and turning unit to indicate when the boxes have been turned through 90° to a position over the case at the loading station. A switch LS10 is mounted below the case conveyor 26 beyond the frame 25, as indicated in FIGURE 18, for engaging the filled case as it is moved completely out of the machine. This switch is connected in the circuit as illustrated in FIGURE 19.

In addition to the switches and solenoids previously referred to, the electrical circuit shown in FIGURE 19 has other elements connected therein as follows: A transformer 160 receives power from a suitable source and this transformer is connected in the circuit to the main switch 161. Fuses 162 are also connected in the circuit. A pilot light 165 connected across the switch indicates when it is closed. A solenoid AV11 connected in the circuit will, when energized, open the 3-way main air valve (not shown), which controls the supply of air to all the other valves previously mentioned and which is spring-returned to closed position. This valve will also bleed air from the machine when the source air is cut off. Limit switch LS3 includes the normally closed contacts 163a and the normally open contacts 163 ganged together and limit switch LS4 similarly includes the contacts 164a and 164 and switches LS3 and LS4 in combination with relay contacts 1CR1 which are connected to and control the solenoid AV6. Series connected relay contacts 2CR1 and 3CR1 and switch LS8 are connected in the circuit to control the solenoid AV7 in combination with switches LS3 and LS4. The circuit also includes a relay coil 1CR and a time-delay relay coil 1TD which are controlled by the switch LS9. Relay contacts 1CR2 and relay coil 2CR are in series in the circuit. Timer switch contacts 1TD control the solenoid AV8 and a reset button 166 is connected in shunt relationship to contacts 1TD to also control solenoid AV8. The switch LS10 includes a first set of normally closed contacts 173 connected in series with the relay contacts 2CR2 for control of relay coil 2CR and a second set of normally open contacts 174 connected with the timer 2TD for control thereof. Timer contacts 2TD1 are connected in the circuit with relay contacts 3CR2 to control the solenoid AV10 and timer contacts 2TD2 are connected in circuit to control solenoid AV3. Relay coil 3CR is connected in series with relay contacts 4CR. Relay contacts 5CR connected in shunt relationship with a reset pushbutton switch 167 are connected in the circuit to a solenoid 169 of the stepping switch 172. An advance pushbutton switch 168 is connected in the circuit to a solenoid 169 of the steppingg switch 172 and is also connected in circuit with timer contacts 2TD2 which normally control operation of solenoids AV3 and 169. A manually operable disconnect switch 171 is also provided. Relay coil 5CR is connected to a No. 6 contact of the stepping switch 172 which serves to reset the stepping switch for initiation of a subsequent cycle. Fixed contacts 1 to 5 of the switch are connected to the signal lights 1 to 5, respectively, and to the relay coil 4CR.

In the operation of the machine, the main switch 161 is closed and the main air supply valve, controlled by the solenoid AV11, is opened. It will be understood that all of the various control valves will be connected to a source of air although these connections are not shown. The opening of the main air supply valve and energization of the electrical control circuit will be indicated by lighting of the pilot light 165. As the boxes P move onto the table 101, and two are moved into engagement with each other and with the stop plate 128, as shown in FIGURE 13, they engage the switches LS1 and LS2, and these switches close and partially complete the circuit to the solenoid AV1. If there are no boxes P on the tilt platform or shelf 131 at this time, the limit switches LS3 and LS4 will not be engaged and will have their contacts 163 and 164 open and their contacts 163a and 164a closed, the latter also controlling the line to AV1. If the clamping unit 29 is properly turned up to receive the boxes, the switch LS5 will also be closed. If all these conditions have been met, then the circuit to the solenoid AV1 will be completed by actuation of the limit switches LS1, LS2 and LS5 to energize the solenoid AV1. This will open the valve 125 (FIGURE 15), controlled by the solenoid AV1, and cause the ram 110 to advance the carriage 28 toward box-clamping position. Approximately one-third of the travel of the carriage toward the opened box clamping and turning unit (FIGURE 14) will cause the cam 28a to open the switch LS6 and the cam 118 to actuate the valve 115 which controls the ram 120. The ram 120 moves the pusher bar 116 over the table plate 101 and by the time the leading edge of the carriage 28 contacts the shelf clamp 131, the pusher bar 116 will be pushing the two boxes P onto the member 131 of the clamping unit, as indicated in FIGURE 15. When the two boxes P move into that clamping unit, they engage and actuate the switches LS3 and LS4, as shown in FIGURE 15. The contacts 163 and 164 of these respective switches then close and complete the circuit through relay contacts 1CR1 to the solenoid AV6 which operates the valve 155 to actuate the rams 150 to move the jaws 132 into box-clamping position. At the same time, the switch contacts 163a and 164a of the limit switches LS3 and LS4 are opened, to break the circuit to the solenoid AV1. Also at this time the solenoid AV2 is actuated to reverse the valve 125 and this actuates the ram 110 to retract the carriage 28 from the box-loading station. When the carriage 28 is retracted approximately ⅔ of its movement so that the clamp unit 29 can turn downwardly without causing the boxes carried thereby to strike the carriage, the switch LS6 is closed by moving out of engagement with the cam 28a and the valve 115 is released from the cam 118. This actuates the ram 120 to retract the pusher bar 116 to its starting position on the table 101. Actuating limit switch LS6 completes the circuit to the solenoid AV4 which actuates the valve 145 to cause the ram 140 to turn the unit 29 through 90° to the position shown in FIGURE 16. When the clamp unit 29 turns downwardly, as indicated, the limit switch LS8 is actuated, as indicated in FIGURE 16. By this time, the limit switch LS7 may or may not be actuated by a case C moving into the box-loading position. Whenever a case closes switch LS7 and if LS8 is actuated as described above, a circuit is completed through the relay contacts 2CR1 and 3CR1 to the solenoid AV7 since the boxes will be turned and the case ready to lift at this time. Energizing the solenoid AV7 sets the front case clamp 42 by actuating the valve 95 to operate the ram 65 and also actuates the ram 90 to lift the case C into telescopic relationship to the suspended boxes P as shown in FIGURE 17. When the case C reaches the extent of its upward movement, the limit switch LS9 is actuated, as shown in FIGURE 17, and this completes the circuit to the relay coils 1CR and 1TD. The coil 1CR, when energized, will open the contacts 1CR1 to break the circuit to the solenoid AV6 which operates the valve 155 to actuate the rams 150 to release the boxes and permit them to drop the rest of the way into the partially telescoping case. Energizing coil 1CR also closes contacts 1CR2 which energizes relay coil 2CR which, in turn, opens contacts 2CR1 which will deenergize solenoid AV7. This operates valve 95 which operates ram 65 to release the front case clamp 42. At the same time, relay coil 2CR closes contacts 2CR2 and completes a holding circuit through the contacts 173 of LS10 to this relay coil which is maintained until LS10 is actuated. The timer 1TD will provide a time interval to permit dropping of the boxes P into the case C during which the circuit is broken at the contacts 1TD and at the end of this interval the circuit to the solenoid AV8 is completed by closing of these contacts. Energization of the solenoid AV8 actuates the valve 95 to operate ram 90 to lower the case clamp and partially release the case by operating the ram 65 to release the front clamp 42. This ensures that the front case clamp 42 will remain in upper nonobstructing position until a filled case has cleared the machine and an empty case has entered.

At the same time that the solenoid AV8 is energized, the solenoids AV9 and AV5 are energized to actuate the respective valves 55 and 145 to operate the respective rams 50 and 140 to move the rear clamp 41 out of stopping position for the case and to turn the clamp unit 29 upwardly, as shown in FIGURE 18. This permits the filled case C to be moved out of the machine by the conveyor 26 and as it clears the machine, the limit switch LS10 is actuated. Actuation of LS10 will open the contacts 173 and deenergize relay coil 2CR and will close the contacts 174 and energize the timer 2TD. At the same time the timer 2TD is energized, solenoid AV3 will be energized through the normally closed contacts 2TD2. After a time interval provided by the timer 2TD, contacts 2TD1 will close and energize solenoid AV10 through the contacts 3CR2. Energizing solenoid AV3 actuates the valve 40 which operates the ram 33 to release the next case so it can enter the machine. Energizing solenoid AV10 actuates the valve 55 which operates the ram 50 to set the rear case clamp 41 in case-stopping position. The switch 171 will be normally closed to include the stepping switch 172 in the circuit but, if desired, the stepping switch can be cut out of the circuit and the switches it controls may be actuated manually. The stepping switch, in this example, is arranged so that every fifth case will pass through the machine without being filled. At the same time that AV3 is energized, stepping solenoid 169 will be energized and move the movable contact of the stepping switch 172 to the next succeeding posittion, it previously being in contact with fixed contact 1 to illuminate signal light 1, to complete the circuit to the signal light 2. When AV3 is deenergized by the timer opening 2TD2, the ram 33 is actuated to return the stop arm 31 to case-stopping position. The above cycle of operations is repeated until the stepping switch movable contact, contacts fixed contact 5. Then, the relay coil 4CR is energized with light 5, and this closes contacts 4CR completing a circuit to relay coil 3CR. This opens contacts 3CR1 and will prevent energizing the front case clamp actuating ram 65 and the lifting ram 140. The empty case will then move from the machine and actuate the switch LS10 to close contacts 174 and completes the circuit through 2TD2 to the stepping solenoid 169 and the solenoid AV3 to start the recycling of the machine. Switch 168 can be manually actuated to move the stepping switch to the next position and switch 167 can be manually actuated to energize the reset solenoid 170 to reset the stepping switch to its starting position. In some dairy installations, it is customary to stack the cases in stacks of four filled cases and one empty case, which is usually at the bottom of the stack so that the filled cases will not be wet during hosing of the floor in the storage area. To accomplish this, the stepping switch may be set as indicated above so that each fifth case is not filled. However, the switch may be set otherwise.

It will be apparent from the above description that I have provided a machine which will receive successive packages and insert them in a handling case. The machine is controlled completely automatically and safeguards are provided to insure that the machine will not operate unless packages and cases are properly supplied and moved into the various positions. The machine reorients the packages as they are loaded into the case so that they will properly fit into the case. The machine positively forces the packages into the case which is important since they have a close-fitting relationship with the case. The machine loads certain cases in succession and will skip the loading of certain cases in accordance with a preset program. The machine will indicate by sequential count indicator lights the number of cases filled in a preset lot or group. The machine is such that it can be synchronized with a subsequent stacking operation. The machine requires no time relationship between the infeed of empty cases and the infeed of filled boxes and either can come first, or simultaneously.

Various other advantages will be apparent.

Having thus described this invention, what is claimed is:

1. A machine for inserting packages into handling cases comprising infeed apparatus for feeding the successive packages and the successive cases to a loading station where the packages and cases are superimposed, and means for relatively vertically moving the superimposed cases and packages to cause them to telescope with each other; said infeed apparatus including means for feeding the packages into the machine in groups of preselected number at the loading station at a higher level and supporting the packages at that station and including means for feeding individual cases successively to said loading station at a lower level, said means for relatively vertically moving the superimposed cases and packages comprising means for lifting each case at the loading station to a position where it telescopes upwardly over said supported packages at the loading station and for then releasing the supported packages, said lifting means lifting the case to a position where it telescopes only partially upwardly over the packages and the packages are supported at a level above the bottom of the case so that when they are released, they drop by gravity into the case, said supporting means for the packages comprising clamping means for receiving the group of packages at said higher level and clamping them, means for turning said clamping means to suspend them for upward movement of the case where it telescopes thereover with a tight fit, said lifting means comprising a case elevator, and means for forcing the elevator upwardly with a selected force so that the case is forced upwardly over the tight-fitting clamp-suspended group of packages.

2. A machine according to claim 1 in which said infeed apparatus comprises a unit for feeding the packages in a group of a predetermined number to the loading station and a separate unit for feeding receiving cases to the loading station, and independent control means for controlling each of said units.

3. A machine according to claim 2 in which the means for vertically moving the superimposed packages and cases comprises an elevating unit for certain cases which move to the loading station, and control means for actuating said unit to lift certain cases at said station and permit passage of others without lifting according to a preset program.

4. A machine for inserting packages into handling cases comprising infeed apparatus for feeding the successive packages and the successive cases to a loading station where the packages and cases are superimposed, means for relatively vertically moving the superimposed cases and packages to cause them to telescope with each other; said infeed apparatus comprising a unit for feeding the packages in a group of a predetermined number to the loading station and a separate unit for feeding receiving cases to the loading station, independent control means for controlling each of said units, said means for vertically moving the superimposed packages and cases comprising an elevating unit for certain cases which move to the loading station, control means for actuating said unit to lift certain cases at said station and permit passage of others without lifting according to a preset program, and counting and indicating means for indicating the sequence of the filled and unfilled cases passing through the loading station.

5. A machine according to claim 1 in which the infeed apparatus for the packages comprises a package-supply conveyor for feeding the packages, a carriage for receiving a group of a selected number of the packages, means for moving the carriage toward the loading station, means on the carriage for moving the group of packages off the carriage at the loading station, means at the loading station for receiving and supporting the group of packages, the infeed apparatus for the cases comprising a case-supply conveyor for moving the successive cases to the loading station at a position below the supported group of packages, said means for relatively vertically moving the superimposed packages and cases comprising an elevator for lifting a case from said case-supply conveyor and moving it upwardly over the supported group of packages in telescopic relationship therewith.

6. A machine for inserting packages into handling cases comprising infeed apparatus for feeding the successive packages and the successive cases to a loading station where the packages and cases are superimposed, means for relatively vertically moving the superimposed cases and packages to cause them to telescope with each other; said infeed apparatus for the packages comprising a package-supply conveyor for feeding the packages, a carriage for receiving a group of a selected number of the packages, means for moving the carriage toward the loading station, means on the carriage for moving the group of packages off the carriage at the loading station, means at the loading station for receiving and supporting the group of packages, the infeed apparatus for the cases comprising a case-supply conveyor for moving the successive cases to the loading station at a position below the supported group of packages, said means for relatively vertically moving the superimposed packages and cases comprising an elevator for lifting a case from said case-supply conveyor and moving it upwardly over the supported group of packages in telescopic relationship therewith, and means for turning said package-supporting means at said loading station to reorient the group of packages relative to the case before it moves upwardly over the group.

7. A machine according to claim 6 including means for stopping said elevator before the case completely telescopes with said supported group, and means for releasing said supporting means to permit the group of packages to drop by gravity the remainder of the distance into the elevated case.

8. A machine according to claim 7 in which said carriage is mounted for horizontal reciprocation toward and from the loading station, said means for moving the carriage comprising a ram operatively connected thereto, said means on the carriage for moving the group of packages off the carriage comprising a pusher member reciprocable relative to the carriage, a ram operatively connected to said pusher member for reciprocating it, said package-receiving means at the loading station comprising a clamp means opening toward the carriage, a ram operatively connected to said clamp means for actuating it to clamp and release the group of packages, said clamp being supported for turning movement about a horizontal axis from its package-receiving position to a downturned position with the clamped packages extending downwardly therefrom, a ram operatively connected to said clamp for turning it about said axis, a clamp on said elevator for clamping the case thereto, ram means operatively connected to said case clamp to cause it to clamp or release the case, a ram operatively connected to said case elevator means to raise an empty case and lower a filled case, and control means for operating said rams and ram means in sequential relation to clamp the case to the elevator, move the carriage to the loading station, operate the pusher member to move the group of packages from the carriage, operate the receiving and supporting clamp to clamp the group of packages, turn the clamp about said axis to downturn the packages, move the elevator upwardly to move the case over the downturned packages, operate the package clamp to release the packages and drop them into the case, lower the case onto said case-feed conveyor, and release the case clamp to permit it to be moved by said conveyor away from said elevator.

9. A machine according to claim 8 in which said clamp on said elevator comprises a pair of case clamp members, one of which serves as a stop for stopping the advance of the case to be elevated with said case-conveyor, and said ram means comprises an actuating ram operatively connected to each of said case clamp members for selectively actuating one or both of them.

10. A machine according to claim 9 in which said package clamp means comprises a pair of clamp members, one of which is relatively fixed and at the same level as said carriage when in package-receiving position, the other clamp member being movable and being connected to and actuated by said package clamp actuating ram.

11. A machine according to claim 10 including a case stop located in advance of said loading station and in cooperation with said case-feed conveyor, and means for releasing said stop to feed a case to said loading station on said conveyor, said means comprising an actuating ram operatively connected to said stop.

12. A machine according to claim 8 in which all of said rams are pneumatic rams, said control means comprising air valves interconnected with the rams for controlling the operation thereof, and an electric control circuit operatively connected with said valves for controlling their operation, said control circuit including switch means responsive to operation of the machine to effect sequential operation of said rams during an operating cycle consisting of loading a predetermined number of said packages into a case.

13. A machine according to claim 12 in which said switch means comprises a plurality of limit switches mounted on the machine in various positions for selective engagement with and actuation by said packages, case and respective ones of the aforesaid machine elements, and a plurality of relay switches controlled by actuation of said limit switches, said limit switches and relay switches being interconnected in said control circuit to permit a succeeding step of machine operation only after proper completion of a preceding step of machine operation.

14. A machine according to claim 12 in which said switch means is operative to effect initiation of successive operating cycles.

15. A machine according to claim 12 in which said control circuit includes auxiliary circuit means selectively connectable in circuit with said switch means and being operative in response to completion of a predetermined number of operating cycles to prevent loading of said packages in a case during the next succeeding operating cycle.

16. A machine according to claim 15 in which said auxiliary circuit means includes switch means responsive to completion of an operating cycle for preventing operation of said rams to load said packages in a case and permitting passage of a case through the machine during said next succeeding operating cycle.

17. A machine according to claim 15 in which said auxiliary circuit means includes indicating means operative upon completion of an operating cycle for indicating the number of operating cycles completed subsequent to said cycle during which the packages are not loaded in a case.

18. A machine according to claim 17 in which said indicating means comprises a plurality of illumination devices which are sequentially energized in response to completion of operating cycles.

References Cited

UNITED STATES PATENTS

| | | | |
|---|---|---|---|
| 2,179,648 | 11/1939 | Thayer | 53—251 XR |
| 2,951,323 | 9/1960 | Haab | 53—61 |
| 2,952,955 | 9/1960 | Leichenich et al. | 53—61 |
| 3,273,304 | 9/1966 | Winter et al. | 53—61 |

FOREIGN PATENTS 1,387,190  12/1964  France.

TRAVIS S. McGEHEE, *Primary Examiner.*

E. F. DESMOND, *Assistant Examiner.*

U.S. Cl. X.R.

53—61, 247, 250

UNITED STATES PATENT OFFICE
CERTIFICATE OF CORRECTION

Patent No. 3,421,283                      January 14, 1969

Warren J. Schieser

It is certified that error appears in the above identified patent and that said Letters Patent are hereby corrected as shown below:

Column 6, line 72, "20" should read -- 120 --. Column 7, line 7, "suuplying" should read -- supplying --. Column 8, line 1, "and" should read -- end --. Column 9, line 21, "nected in the circuit to a solenoid 169 of the stepping" should read -- nected in circuit with a reset solenoid 170 of a stepping --. Column 11, line 5, "posittion" should read -- position --.

Signed and sealed this 17th day of March 1970.

(SEAL)
Attest:

Edward M. Fletcher, Jr.                      WILLIAM E. SCHUYLER, JR.
Attesting Officer                                Commissioner of Patents